UNITED STATES PATENT OFFICE.

JACOB J. LAVO, OF KANSAS CITY, MISSOURI.

IMPROVEMENT IN COMPOUNDS FOR PREVENTING AND REMOVING INCRUSTATIONS FROM STEAM-BOILERS.

Specification forming part of Letters Patent No. 157,917, dated December 22, 1874; application filed June 9, 1874.

*To all whom it may concern:*

Be it known that I, JACOB J. LAVO, of Kansas City, in the county of Jackson and State of Missouri, have invented certain new and useful Improvements in Compound for Preventing and Removing Incrustations from Steam-Boilers; and I do hereby declare the following to be a full, clear, and exact description of the invention, such as will enable others skilled in the art to which it pertains to make and use it, reference being had to the accompanying drawings, which form part of this specification.

My invention relates to a new and improved compound for preventing and removing incrustations from steam-boilers, and preventing foaming in the same; and it consists in a composition of what is known in the trade as English caustic, (caustic soda), chloride of iron, muriate of baryta, glycerine, cider vinegar, and ordinary molasses, with water, and compounded and applied in the manner hereinafter fully set forth.

In carrying out my invention, I take fifteen (15) pounds of English caustic soda, and boil it in twenty-four pounds of water until it is completely dissolved. I then add, while the solution is still boiling, eleven (11) pounds of muriate of baryta, and boil until this is completely dissolved, after which I add, still keeping the solution boiling, eight (8) pounds of chloride of iron, and continue the boiling until this is dissolved. I then add twenty-four (24) pounds of molasses, and thoroughly mix the same with the solution, after which I add ten (10) pounds of glycerine, and eight (8) pounds of vinegar, and mix the whole thoroughly by stirring or otherwise. When the composition becomes cool it is ready for use.

I employ my composition as follows, viz: For dissolving and removing the scales and incrustations from steam-boilers, I inject into the boiler, or into the water to be supplied to the boiler for generating steam, a quantity of the compound, which will vary according to the nature of the water employed in the boiler. I generally apply it in the proportion of from one quart to one gallon for every fifty barrels of water employed, and continue using the boiler at its ordinary work until all incrustation is removed. The proportion of the compound to be used will also vary in different cases, depending upon the thickness and character of the scales and incrustation to be removed, the lighter scales requiring the use of only one quart of the compound to fifty barrels of water, and the thicker or heavier scales requiring proportions varying from one quart to the full amount of one gallon to every fifty barrels of water. For the purpose of preventing the formation of scales or incrustation, and foaming in the boiler, and of preventing boilers from corroding while in use, I inject into the boiler, or into the water to be employed, from one-half pint to one quart of the compound to every fifty barrels of water used, the proportion varying according to the nature of the water employed, soft and pure water requiring the use of only one-half pint of the compound, and hard or impure water a proportion varying from one-half pint to the full amount of one quart to every fifty barrels of water.

It is evident that my compound may be used in all kinds of boilers for generating steam, whether movable or stationary.

What I claim, and desire to secure by Letters Patent, is—

The composition herein described, consisting of English caustic soda, chloride of iron, muriate of baryta, molasses, vinegar, glycerine, and water, compounded as set forth, for the purposes specified.

In testimony that I claim the foregoing I have hereunto set my hand this 4th day of June, 1874.

JACOB J. LAVO.

Attest:
L. C. SLAVENS,
J. O. CASTELLO.